May 6, 1941.   H. S. JANDUS ET AL   2,241,035
FENDER SHIELD
Filed Dec. 19, 1938   4 Sheets-Sheet 2
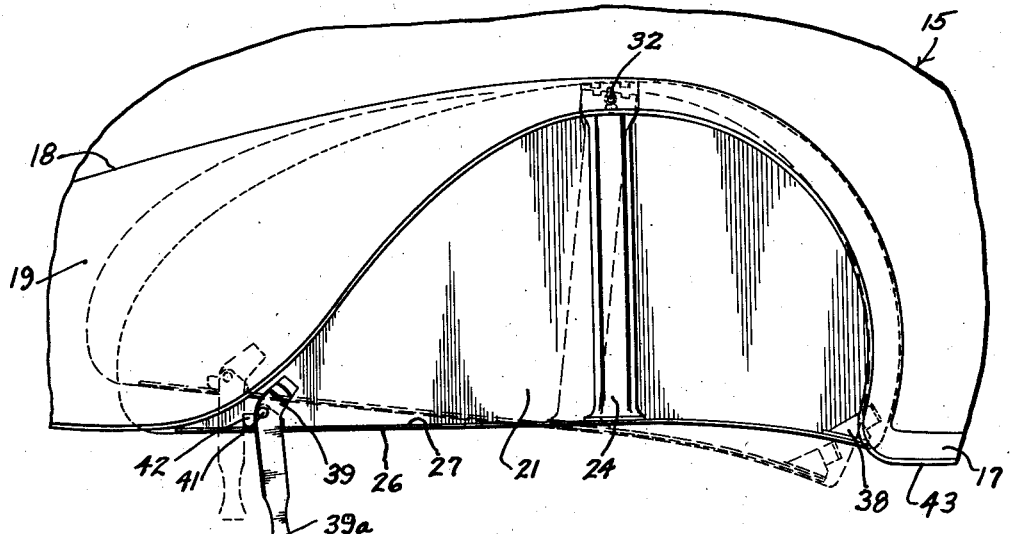
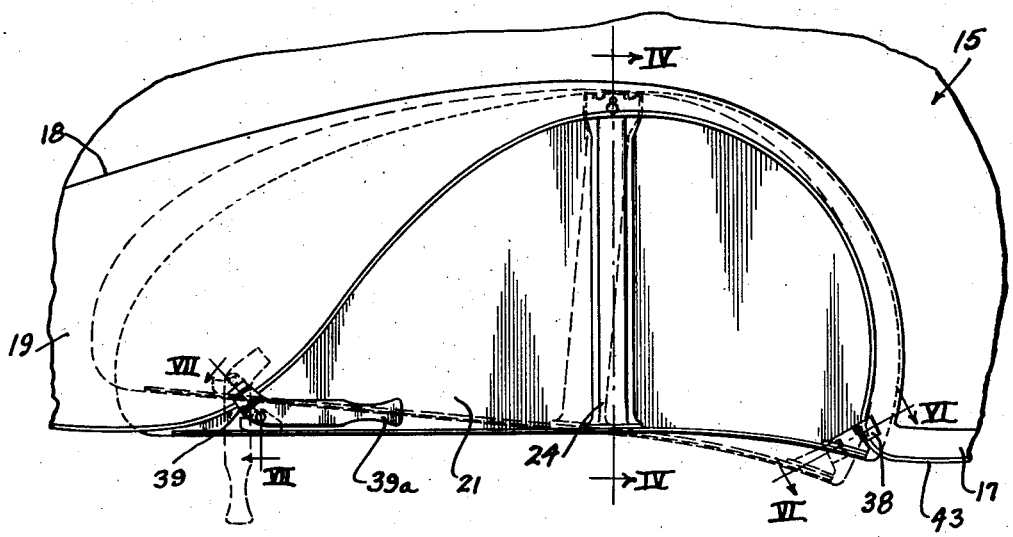
Inventors
HERBERT S. JANDUS.
ARTHUR P. FERGUESON.
by

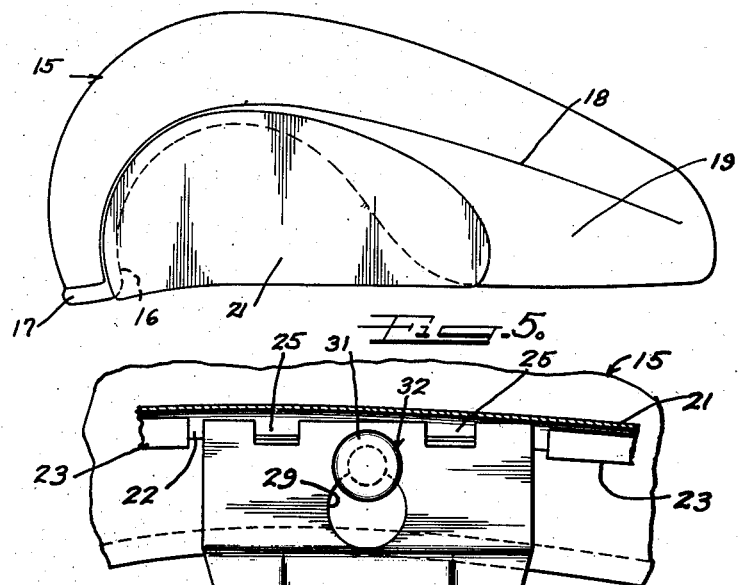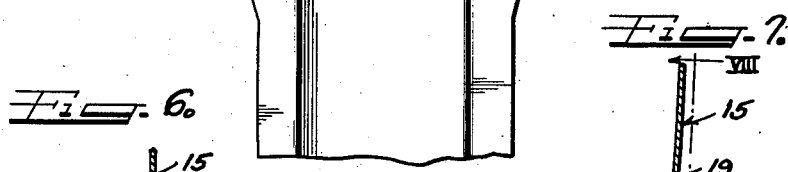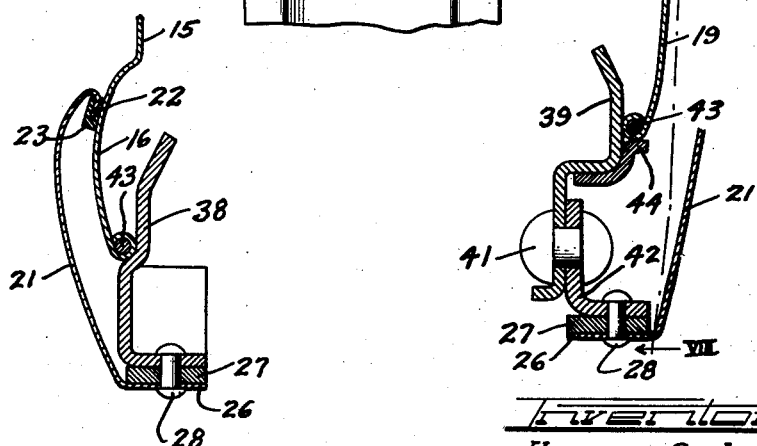

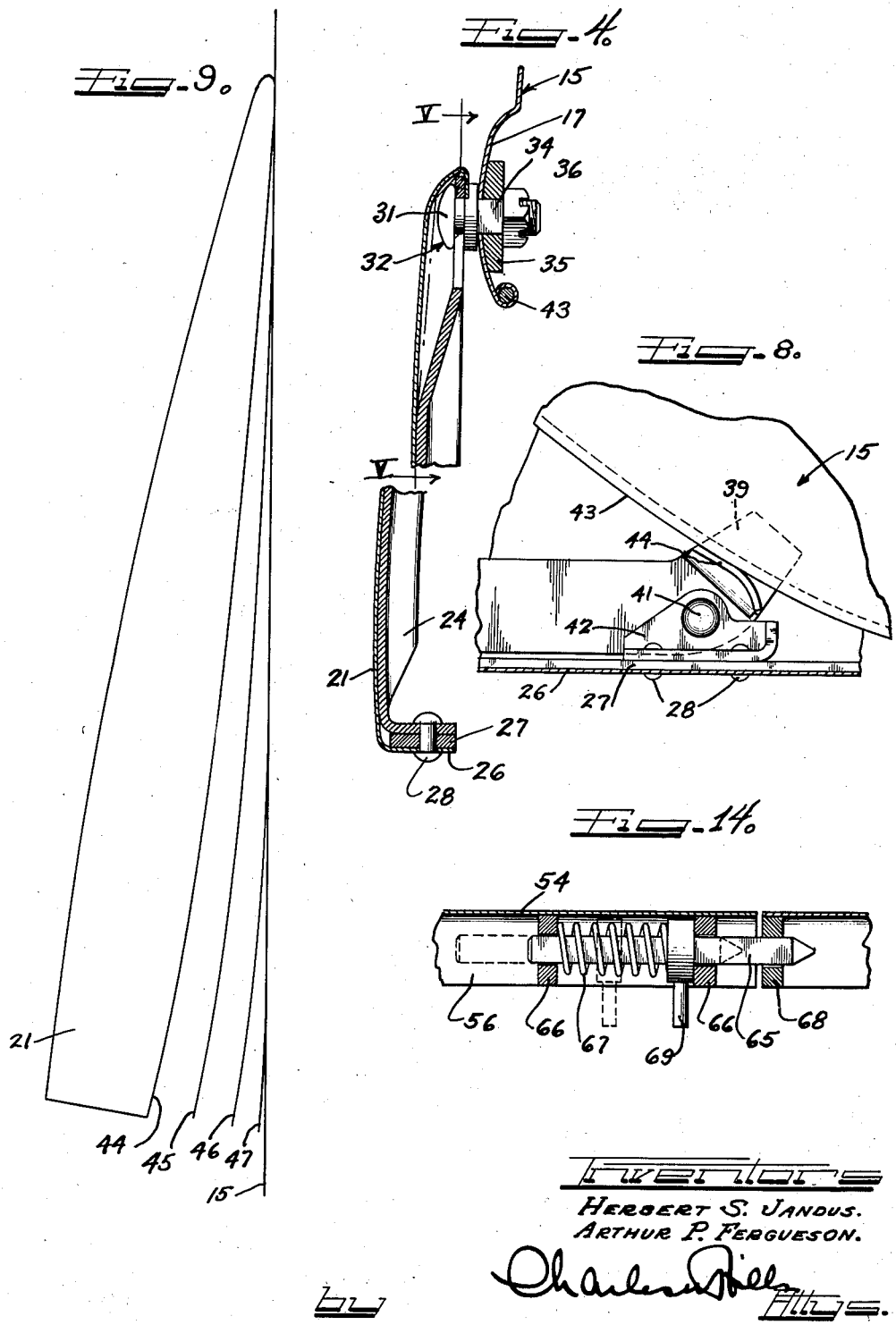

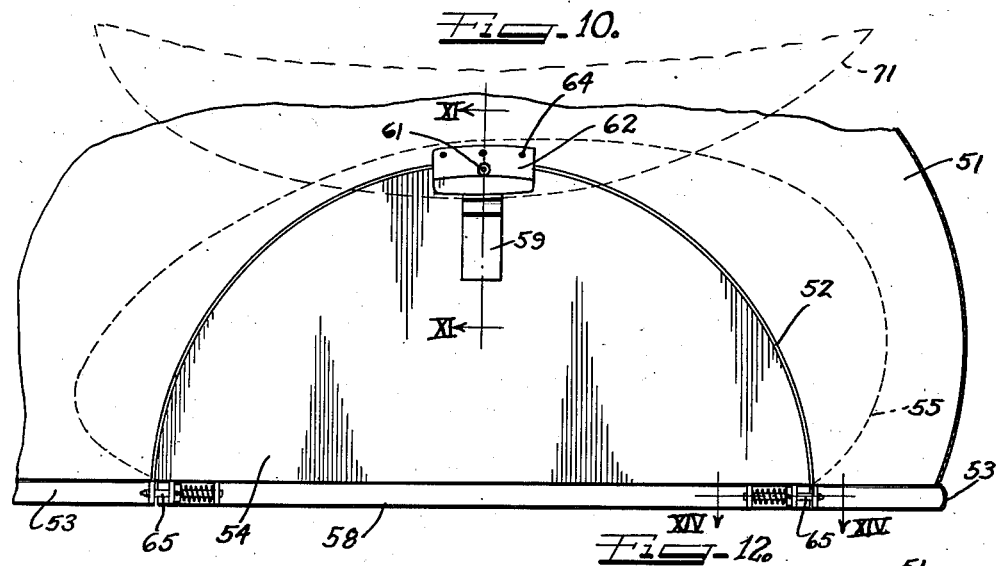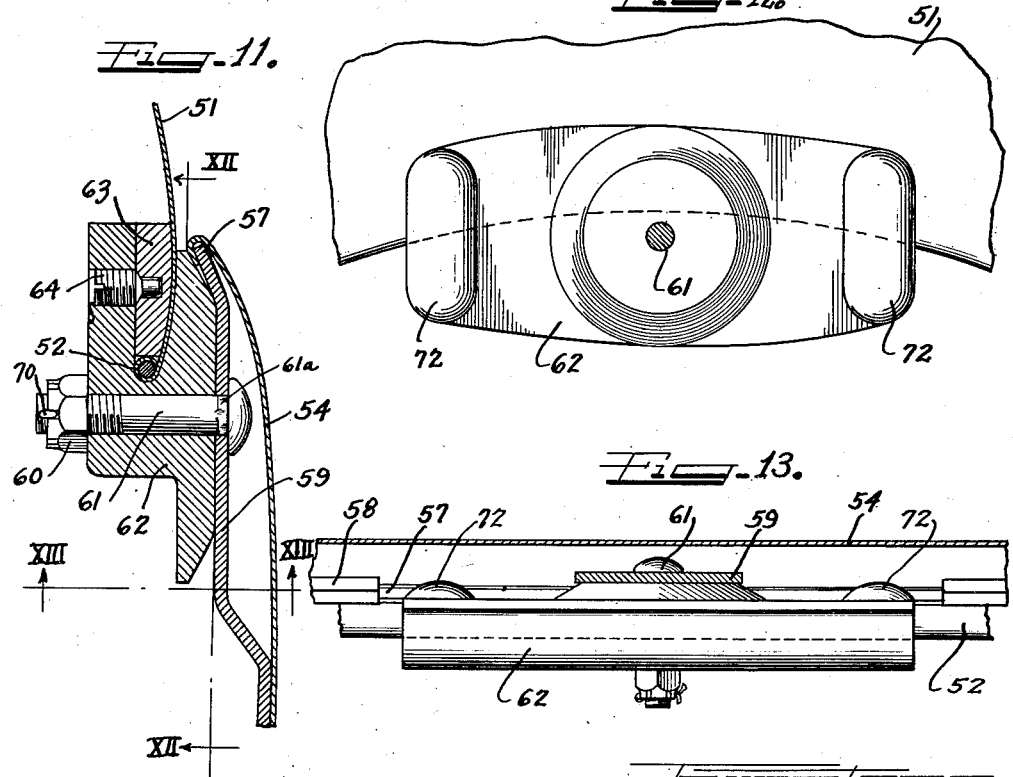

Patented May 6, 1941

2,241,035

UNITED STATES PATENT OFFICE 2,241,035

FENDER SHIELD

Herbert S. Jandus and Arthur P. Fergueson, Detroit, Mich., assignors to Houdaille-Hershey Corporation, Detroit, Mich., a corporation of Michigan Application December 19, 1938, Serial No. 246,692

10 Claims. (Cl. 280—153)

This invention relates to means for covering or closing the wheel access opening in the fender or side of a vehicle. In particular, our invention relates to "fender shields" or "fender skirts," as such devices are known when used in connection with a fender, but this invention is equally applicable to automotive vehicles having a body wide enough to enclose the wheels without the use of fenders and in which the wheel access openings are in the sides of the body itself. Bodies of this type are to be found today only among commercial vehicles, such as trucks and busses, and are occasionally custom built for private vehicles, and we wish it to be expressly understood that this invention is equally applicable to such bodies on commercial and private vehicles as well as being applicable to fenders. Therefore, while we have referred to our invention as a "fender shield," it is to be clearly understood that this term includes covers for wheel access openings in the side of a body or other wheel enclosing member as well as for wheel access openings in fenders.

In designing ornamental fender shields or skirts of the type adapted to cover the usual wheel access opening in a vehicle fender or body, it is important that the means which is employed to secure the fender shield in position be simple and quick to operate both in assembling the fender shield on the vehicle fender and in removing it therefrom. It must also possess a considerable degree of ruggedness when in use and be substantially free from vibration and noise.

It is an object of this invention to provide a novel ornamental fender shield which possesses the above highly desirable characteristics.

It is a further object of the present invention to provide a novel fender shield which is resilient and which is arranged to be mounted on a fender by being first supported at the top and then progressively flexed towards the two lower corners so that it is finally pressed tightly against the side of the fender around all of that part of its edge which overlies the fender.

It is a further object of this invention to provide an improved fender shield which is economical to manufacture and which is rugged and reliable in use.

It is a still further object of this invention to provide a novel means for retaining the entire fender-engaging edge portion of an ornamental fender shield in tight engagement with the fender.

Another object of this invention is to provide a novel means of supporting a fender shield on a fender, and which is applicable to various types of fenders whether or not they are especially designed to be used with fender shields.

Another object of this invention is to provide a fender shield having a panel of which no portion fits within the wheel access opening and against the edge of the fender, thus making the fit of the fender shield independent of the exact size of the wheel access opening and making possible the use of the same fender shield panel on different fenders of the same general contour merely by changing the location or shape of the fender shield panel supporting means.

Another object of this invention is to provide a fender shield in which the mechanism which finally latches the fender shield in position on the fender is disposed entirely near the lower edge of the fender shield where it may be readily reached by reaching in under the edge of the fender shield and operated therefrom without the necessity of providing long links or levers as a part of the latching mechanism.

Another object of this invention is to provide a construction in which the weight of a fender shield is transmitted to the fender by a rigid supporting means at the top of the fender so that there will be no possible vertical movements of the fender shield when the vehicle strikes bumps or obstructions in the road.

Another object of this invention is to provide a novel means of supporting a fender shield on a fender in which the top of the fender shield is unyieldingly supported on the fender and positively prevented from sliding forward or backward and in which the lower part of the fender shield is positively prevented from swinging in any direction.

The novel features which we believe to be characteristic of our invention are set forth with particularity in the appended claims. Our invention itself, however, both as to its organization and manner of construction, together with further objects and advantages thereof, may best be understood by reference to the following description, taken in connection with the accompanying drawings, in which:

Figure 1 is a side elevational view of a vehicle fender having one embodiment of our novel ornamental fender shield mounted thereon;

Figure 2 is an inside elevational view of the form of the invention shown in Figure 1 as seen from the inside of the fender, showing the back or inner side of the fender shield as it is being mounted upon the fender;

Figure 3 is a view similar to Figure 2 but showing the fender shield completely mounted upon the fender;

Figure 4 is a cross-sectional view through the fender shield and the edge of the fender, taken on the line IV—IV of Figure 3 and looking in the direction of the arrows;

Figure 5 is a longitudinal sectional view through a portion of the upper edge of the fender shield and showing a portion of the fender, the section being taken on the line V—V of Figure 4 and looking in the direction of the arrows;

Figure 6 is a cross-sectional view through the hook at the forward end of the fender shield, taken on the line VI—VI of Figure 3 and looking in the direction of the arrows;

Figure 7 is a cross-sectional view through the latch at the rear of the fender shield, taken on the line VII—VII of Figure 3 and looking in the direction of the arrows;

Figure 8 is a side view of the latch at the rear of the fender shield and of the portion of the edge of the fender with which the latch cooperates, the view being taken from the line VIII—VIII of Figure 7 and looking in the direction of the arrows;

Figure 9 is a diagrammatic view showing how the fender shield is flexed in being fitted against the side of the fender;

Figure 10 is a view of a second embodiment of the invention as applied to a slightly different type of fender and showing a modified means for securing the fender shield to the fender;

Figure 11 is a cross-sectional view through a portion of the attaching means employed on the embodiment of the invention shown in Figure 10, the section being taken on the line XI—XI and looking in the direction of the arrows;

Figure 12 is a face view of the portion of the attaching means shown in Figure 11 that is fixed to the fender, the view being taken from the line XII—XII and looking in the direction of the arrows;

Figure 13 is a horizontal section through a portion of the fender shield showing the portion of the attaching means shown in Figure 11, the section being taken on the line XIII—XIII of Figure 11 and looking up in the direction of the arrows;

Figure 14 is a horizontal section through one portion of the attaching means at the lower edge of the fender shield, the section being taken on the line XIV—XIV of Figure 10 and looking in the direction of the arrows.

The preferred forms of the present invention each comprise a resilient fender shield which is applied to a fender by first being secured, either permanently or detachably, at the top of the wheel access opening in the side of the fender so that the upper edge of the fender shield lies against the side of the fender. The fender shield is formed so that, when it is thus only partially secured in place, it curves out away from the side of the fender. After being secured at the top, the fender shield is progressively flexed towards its two lower corners until its edge is pressed tightly against the side of the fender from the point of attachment at the top around and down to both of the lower corners. Both the front and rear portions of the fender shield may be flexed into place simultaneously and secured in place simultaneously, as in one form of the invention described in detail below, or one portion may be flexed and secured in place before the other, as in the other form described below.

The embodiment of the invention shown in Figures 1 to 9 is designed to be mounted upon one of the latest designs of "streamlined" automobile fenders 15 having a "streamlined" wheel access opening whose edge is indicated by the dotted line 16 in Figure 1. At the bottom of the front of the fender and in front of and over the top of the wheel access opening 16, the fender is embossed to simulate a molding 17 and to increase its rigidity. From a point above the wheel access opening 16, the edge 18 of the raised or embossed portion sweeps back in a long flowing curve which leaves a relatively wide approximately flat portion 19 of the side of the fender in back of the wheel access opening 16.

The fender shield or cover for the wheel access opening 16 comprises a sheet metal panel 21 which is large enough to cover the wheel access opening and to extend a short distance over the side of the fender above and on each side of the wheel access opening. In back of the wheel access opening, the fender shield panel 21 extends back over the lower part 19 of the side of the fender.

As may be seen from Figure 1, the general shape of the fender shield panel 21 is "streamlined" and harmonizes with the shape of the "streamlined" fender 15. The edge of the fender shield panel 21 lies over the bead or molding 17 at the front of and above the wheel access opening 16 and continues back in a curve lying below the line 18 forming a continuation of the edge of the molding 17 on the rear part of the fender.

Around the sides and top of the panel 21, its edge 22 is folded back under as shown in Figures 4, 5 and 6, and carries a rubber edging 23 which prevents metal-to-metal contact between the panel 21 and the fender 15. At the center of the top of the panel 21, there is a gap in the edging 23 which leaves a short section of the folded over edge 22 exposed so that it may be engaged by the upper end of a pressed sheet metal stay 24 on the back of the fender shield. The upper end of the stay 24 fits up between the body of the panel 21 and the folded over edge 22, as shown in Figures 4 and 5, and is formed with a pair of rectangular notches cut out of its upper edge. The folded over edge 22 of the panel 21 is slit in line with the edges of these notches, and the tabs 25 between the slits are bent back into the notches to prevent slipping of the stay 24 relative to the panel 21.

The bottom edge of the panel 21 is bent over, as shown in Figures 4, 6 and 7, to form a rearwardly extending substantially horizontal flange 26 extending almost the entire length of the bottom of the fender shield. The flange 26 is reinforced by a bar 27 extending along it and riveted on top of it. The lower end of the stay 24 is bent back horizontally and lies on top of the reinforcing bar 27 to which it is secured by one or more of the same rivets 28 which fasten the reinforcing bar 27 to the bottom flange 26 of the fender shield panel 21.

The stay 24 forms one of the principal parts of the means for supporting the fender shield on the fender. At its upper end, the stay 24 is provided with a keyhole-shaped hole 29, the larger round portion of the hole being below the narrow upward extension of it. The large part of the hole 29 is large enough to pass over the head 31 of a stud or button 32, and the upper part of the hole 29 is shaped to fit around the neck 33 of the stud. The stud or button 32 is fixed to the fender 15 just above the wheel access opening 16 in any suitable manner. In the particular example illustrated, the stud 32 has a square shank 34 which extends through a hole in the molding 17 embossed around the edge of the wheel access opening and through a filler piece 35 fitting on the inside of the molding 17. The end of the shank 34 is round and is threaded and carries a nut 36 by means of which the stud 32 is secured in place. An integral collar 37 between the neck 33 and the shank 34 of the stud bears against the outside of the fender 15 and cooperates with the nut 36 to tightly clamp the fender 15 and the filler piece 35.

The hole 29 in the stay 24 is placed as near its upper end as possible, which results in the folded over edge 22 of the fender shield panel 21 lying between the top of the stay 24 and the collar 37 on the stud 32. In order to accommodate the resulting additional thickness at the top, the collar 37 is notched out as shown in Figure 4, and the square shank 34 of the stud fitting into the square hole in the filler piece 35 insures that the notch in the collar 37 will lie at the proper angle when the stud is assembled on the edge of the fender. If desired, the neck 33 of the stud may be wide enough to accommodate both the stay 24 and the folded over edge 22 of the fender shield panel, in which case it will be unnecessary to provide a notch in the collar 37 or to make the shank 34 of the stud square.

The bottom of the fender shield is held down and in against the side of the fender by means of two hooks 38 and 39, one near each end of the fender shield. The hook 38 at the front of the fender shield is formed of a piece of heavy sheet metal, as shown in Figure 6, and is secured to the top of the reinforcing bar 27 by the same rivets 28 which secure the reinforcing bar to the flange 26 at the bottom of the fender shield panel 21.

The hook 39 at the rear of the fender shield is carried by a pivot 41 on a bracket 42 which is secured to the reinforcing bar 27 in the same manner as the front hook 38. In order to facilitate its operation, the rear hook 39 is formed with an extension 39a or handle which lies above and behind the reinforcing bar 27 when the hook is in its operative position, as shown in Figure 3. The handle 39a can be grasped from the front of the fender shield by reaching in under its lower edge and it permits the hook 39 to be swung around easily into its retracted position shown in Figure 2.

Both the front hook 38 and the rear hook 39 are arranged to engage both the back and the under side of a bead 43 formed on the edge of the fender. In the case of the front hook 38, this is accomplished by shaping the hook itself so that it fits around the bead 43, and, in the case of the rear hook 39, a cam member 44 is welded on the front face of the hook in a position in which it will press tightly against the under side of the bead 43 when the rear hook 39 is swung into its operative position.

The manner of applying the fender shield may be seen from Figures 2 and 3. The first step in this operation consists in holding the fender shield up against the fender and in passing the hole 29 in the stay 24 over the head 31 of the stud or button 32 and letting the fender shield drop down until its weight is carried on the neck 33 of the stud as shown in Figures 4 and 5. The fender shield will then be in the position shown in full lines in Figure 2 with neither of the hooks 38 or 39 engaged with the rolled edge 43 of the fender. The fender shield is then swung back, pivoting on the stud 32, to the position shown in dotted lines in both Figures 2 and 3. The hook 38 is then clear of the edge of the fender and the front part of the fender shield can be pushed in against the side of the fender. The entire fender shield is then swung forward while its front part is held in against the fender, and the hook 38 passes in back of the fender and engages its rolled edge 43 as shown in Figure 6 and, in full lines, in Figure 3. The rear portion of the fender shield is then pushed in against the side of the fender and the hook 39 is swung around by means of its handle 39a to the position shown in full lines in Figure 3. When the hook 39 is in this position, it extends in back of the fender, holding the rear portion of the fender shield in against the side of the fender, and the cam member 44 presses tightly against the bottom of the rolled edge 43 and holds the fender shield down tight on the supporting stud 32.

It will be seen that the fender shield is held against the side of the fender at only three points, namely, at the top where it is supported on the stud 32, and at each end of the bottom where the hooks 38 and 39 extend around in back of the fender. Although it is held in against the side of the fender at only three points, the fender shield panel 21 is formed in such a way that it presses tightly against the side of the fender around the entire portion of its periphery which overlies the fender. This is accomplished by making the edge of the fender shield between one point of attachment and the next convex relative to the surface of the fender against which it is to fit. If the fender shield is held up against the fender and is not flexed out of its natural shape, it will be found that the edge of the fender shield touches the fender at two points, one at the front and one at the back, located between the points of attachment. It will also be seen that as one moves around the edge of the fender shield from either point of contact to any of the points of attachment, the space between the edge of the fender shield and the side of the fender increases until it is a maximum at the point of attachment. It will also be noted that, when the fender shield is viewed from either end, its edge will appear to be convex relative to the side of the fender, and that, when the fender shield is viewed from above, its upper edge will appear to be concave relative to the side of the fender. When the fender shield is being placed on the fender as described above, it will be found necessary to flatten the upper edge of the fender shield against the side of the fender before the hole 29 in the stay 24 can be engaged over the head 31 of the stud 32. After this engagement has been effected, the fender 15 and fender shield panel 21 will appear as shown diagrammatically in Figure 9 if they are viewed from one end. Figure 9 also shows how, when the fender shield is fastened only at the top, the bottom of the shield will be spaced out from the side of the fender with the edge 44 of the fender shield which is to fit against the side of the fender 15 lying at an angle to it and being convex with respect to it. As the next step in the mounting of the fender shield takes place, namely, the pushing in of the bottom of the fender shield against the side of the fender, the fender contacting edge 44 of the fender shield successively assumes the positions shown by the lines 45, 46 and 47 until it is brought against the side of the fender 15. The front and the back edges of the fender shield, however, are not flattened simultaneously against the side of the fender, but, as pointed out above, the front is first pushed against the fender before the front hook 38 is engaged behind the edge of the fender by a swinging of the entire fender shield about the stud 32 and then the rear part of the fender shield is pressed in against the side of the fender and the pivoted hook or latch 39 is rotated into its locking position shown in Figure 3.

The form of our invention shown in Figures 1 to 9 is only one of many possible forms. The means for holding the top of the fender shield to the fender need not comprise a stud fitting into a hole in a stay as shown, but may be any arrangement which will support the weight of the fender shield on the fender and which will hold the top of the fender shield in against the side of the fender. This arrangement may be one which will allow the fender shield to be hooked on to the fender by a downward movement and separated therefrom by a reverse movement, or may be one in which the fender shield is permanently attached to the fender but can be swung up clear of the wheel access opening when necessary. The stud 32, instead of being bolted through a hole in the edge of the fender, may be carried by a removable clamp which can be applied to the fender without the necessity of drilling it or otherwise marring it in any way. The hooks at the bottom of the fender shield may be replaced by any means which will hold the bottom of the fender shield in tightly against the side of the fender and which can be engaged after the top of the fender shield is in place. For example, two latches may be used, one at each end, and they may be provided with separate or with a common operating means. These latches may be in the form of bolts and be capable of supporting the weight of the fender shield, in which case the top of the fender shield need be provided with a fastening means that is only capable of holding it in tight against the side of the fender and which need not be able to carry the weight of the fender shield.

The form of the invention shown in Figures 10 to 14 illustrates many of the modifications discussed above. In this form of the invention, a fender 51 is provided with a wheel access opening which is approximately semicircular in shape and which need only be large enough to allow the wheel enclosed by the fender to be removed. The edge of the fender 51 around the wheel access opening is formed into a bead 52 and the lower edge of the fender in front of and behind the wheel access opening is embossed into a molding 53 in order to strengthen and stiffen the fender.

The fender shield comprises a panel 54 having a "streamline" shape indicated by the dotted line 55 and fitting against the outer side of the fender and covering the wheel access opening. The bottom of the fender shield panel 54 is embossed to form a molding 56 similar to and forming a continuation of the molding 53 at the bottom of the fender ahead of and behind the wheel access opening.

The curved edge of the fender shield panel 54 is bent over to form a fold 57, as shown in Figures 11 and 13, which carries a rubber edging 58 similar in cross section to that shown at 22 in Figure 6. At the middle of the top of the fender shield, the rubber edging 58 is interrupted so as not to interfere with the means for holding the top of the fender shield in place.

The fender shield attaching means comprises a stay 59 whose upper end extends up under the folded over edge 57 of the fender shield panel and which is spot welded or otherwise secured to the panel in order to prevent relative movement therebetween. The stay 59 is secured to the fender by a bolt 61 which extends perpendicularly to the side of the fender and through a forged bracket 62 mounted at the top of the wheel access opening. The portion 61a of the bolt passing through the stay or brace 59 is square so as to hold the bolt from turning when the nut 60 is being screwed on. The nut 60 is not screwed up tight, but is fixed by a cotterpin 70, and the portion of the bolt extending through the bracket 62 is round so that the entire fender shield can swing around in a plane tangent to the side of the fender, the bolt and nut turning with the fender shield.

The bracket 62 fits around the beaded edge 52 of the fender 51 and is provided with a pad or block 63 which fits against the back of the fender just above the beaded edge 52. In mounting these parts on the fender, the clamping pad 63 is first placed in position above the bead 52 on the edge of the fender. The bracket 62 is then slid up into place, embracing both the edge of the fender 51 and the clamping block 63, and is secured there by means of set screws 64 which engage the clamping block 63. To prevent removal of the bracket 62, the metal around the set screws 64 can be peened over them as shown in Figure 11.

At each end of its lower edge, the fender shield panel 54 is provided with a bolt 65 mounted within the molding 56. Each bolt 65 is carried by a pair of blocks 66 and is pressed outwardly by a spring 67 which keeps it engaged with a block 68 mounted in the back of the molding 53 at the lower edge of the fender. The bolt 65 may be readily retracted from the block 68 to the position shown in dotted lines in Figure 14 by means of a handle 69 which is secured to it and which may be operated by reaching in under the lower edge of the fender shield.

It may be seen from the above that the fender shield panel 54 in this form of the invention is held against the side of the fender 51 at three spaced points, namely, at the center of the top, and at each of the two bottom corners, and is thus similar to the first embodiment of the invention shown in Figures 1 to 9. In order to secure a tight engagement of the entire edge 55 of the panel 54 with the side of the fender 51, the fender shield panel 54 is made curved with respect to the side of the fender 51 against which it is to fit in the same way as the fender shield panel 21 in the first described form of the invention. Thus, when the bolts or catches 65 at the bottom of the fender shield panel 54 are released, the bottom of the fender shield will spring out away from the side of the fender, and it will be possible to swing the entire fender shield around the bolt 61 which supports it at the top, using the bolt as a pivot, until the fender shield is upside down above the wheel access opening and occupies the position shown by the dotted lines 71 in Figure 10. When the fender shield is in this position, it is practically clear of the wheel access opening, and the wheel or tire to be changed may be reached as readily as if the fender shield were completely removed.

It is desirable to provide some means of holding the fender shield in its upper position indicated by the dotted lines 71 in Figure 10 so that it will stay in this position without being manually held while the wheel or tire is being changed. Any suitable means may be provided for this purpose and may take the form of a spring catch, a positive latch or other mechanism. One arrangement which may be used is shown in the drawings and comprises merely a pair of bosses 72 on the bracket 62 which supports the fender shield. The bosses 72 are spaced apart laterally as shown in Figures 12 and 13 and are adapted to engage the folded over edge 57 of the fender shield panel. When the fender shield is in its normal position, the folded over edge 57 extends across above the two bosses 72, and, when the fender shield is inverted, the edge 57 extends across below the two bosses 72 and holds the fender shield in its inverted position. The edge of the fender shield is resilient enough and the bosses 72 are made low enough so that the fender shield can be swung around from one position to the other, the edge of the fender shield flexing up over the bosses 72 as this is done. If greater resiliency than is provided by this construction is found to be desirable, the bosses 72 may, of course, be mounted upon a separate strip of spring metal instead of being made integral with the bracket 62.

From the above description, it will be apparent that we have provided an extraordinarily simple means for securing an ornamental fender shield to a vehicle fender in such a way that it will fit tightly all around its periphery. It will also be apparent that we have provided a fender shield which is extremely simple to move into or out of position and that can be readily manipulated by inexperienced persons.

While we have shown only two particular embodiments of our invention, it will of course be understood that we do not wish to be limited thereto, as many modifications may be made, and we therefore contemplate by the appended claims to cover all such modifications as fall within the true spirit and scope of our invention. It is also to be understood that while the two embodiments of the invention which have been described in detail above have been described as being applied to a fender, they are equally applicable to a vehicle in which the wheel access opening is directly in the side of the body rather than in a separate fender, and in which the so-called fender shield fits against the side of the body itself. It is also to be understood that the term "side of a vehicle" and the like, as used in the claims, includes the side of the fender of a vehicle and that the term "fender" includes the side of a vehicle body where the body itself, rather than a separate fender, encloses the wheel.

We claim as our invention:

1. As an article of manufacture, a resilient fender shield having supporting means near the top engageable with cooperating means on a fender for preventing downward, lateral and outward movements of the top of the fender shield while permitting lateral and inward movements of the lower portion of the fender shield, said shield being progressively flared outwardly from top to bottom when taken with respect to said fender, and means engageable with cooperating means on a fender after the complete engagement of said supporting means and after said shield has been flexed into tight engagement with said fender for preventing upward, lateral and outward movements of the bottom of the fender shield.

2. A cover for closing a wheel access opening in the side of a vehicle, the side edges of the opening diverging downwardly away from each other at the bottom, said cover comprising a resilient panel large enough to cover and to extend beyond said opening with the edge of said panel bearing against said vehicle side along a curved line extending across above and down at the sides of said opening, said resilient panel when unstrained being convex from top to bottom relative to said vehicle side, securing means at the top of the back of said panel and rigid therewith, said securing means being formed to interengage a complementary securing means on said vehicle side at the top of said opening when moved down relative thereto and to cooperate therewith to support said cover and hold the upper edge of said panel against said vehicle side, and securing members on the back of said panel just above its lower edge, said securing members being placed so as to extend around behind the downwardly diverging side edges of said wheel access opening for holding the lower portion of the side edges of said panel against said vehicle side and at least one of said securing members being retractable from behind said vehicle side so as to allow at least one side of said cover to spring out from said vehicle side and to allow said cover to be removed from over said opening.

3. A cover for closing a wheel access opening in the side of a vehicle comprising a resilient panel large enough to cover and to extend a substantial distance beyond said opening with the edge of said panel bearing against said vehicle side along a curved line extending across above and down at the sides of said opening, said resilient panel when unstrained being convex from top to bottom relative to said vehicle side, a securing member permanently fixed to the back of said panel near the upper edge thereof and formed to hook onto securing means on the vehicle side when moved down relative thereto and to cooperate therewith to support said cover and hold the upper edge of said panel against said vehicle side, and securing members on said panel near the bottom thereof and constructed and arranged to engage said vehicle side at the sides of said opening for holding the side edges of said panel against said vehicle side, at least one of the securing members near the bottom of the panel being movable and releasable from said vehicle side so as to allow at least one side of said cover to spring out from said vehicle side at the bottom and to allow said cover to be removed from over said opening.

4. A cover for closing a wheel access opening in the side of a vehicle comprising a panel large enough to cover and to extend a substantial distance beyond said opening with the edge of said panel bearing against said vehicle side along a curved line extending across above and down at the sides of said opening and vertically slidable with respect to said vehicle side, a piece of sheet metal on the back of and spaced from and approximately parallel to the body of said panel, said piece of sheet metal having a hole with the lower portion large enough to pass over the head of a button fixed to the vehicle side at the top of the wheel access opening and an upper portion small enough to fit down behind the head of the button and embrace the neck of the button, and means at the bottom of said panel for engaging said vehicle side and holding said panel down and holding the lower part of said panel against said vehicle side.

5. A cover for closing a wheel access opening in the side of a vehicle comprising a panel large enough to cover and to extend a substantial distance beyond said opening with the edge of said panel bearing against said vehicle side along a curved line extending across above and down at the sides of said opening and vertically slidable with respect to said vehicle side, a piece of sheet metal on the back of and spaced from and approximately parallel to the body of said panel, said piece of sheet metal having a hole with the lower portion large enough to pass over the head of a button fixed to the vehicle side at the top of the wheel access opening and an upper portion small enough to fit down behind the head of the button and embrace the neck of the button, and means at the bottom of said panel for engaging said vehicle side and holding said panel down and holding the lower part of said panel against said vehicle side, said means comprising hooks formed to extend around behind said vehicle side.

6. A cover for closing a wheel access opening in the side of a vehicle comprising a panel large enough to cover and to extend a substantial distance beyond said opening with the edge of said panel bearing against said vehicle side along a curved line extending across above and down at the sides of said opening and vertically slidable with respect to said vehicle side, a piece of sheet metal on the back of and spaced from and approximately parallel to the body of said panel, said piece of sheet metal having a hole with the lower portion large enough to pass over the head of a button fixed to the vehicle side at the top of the wheel access opening and an upper portion small enough to fit down behind the head of the button and embrace the neck of the button, and means at the bottom of said panel for engaging said vehicle side and holding said panel down and holding the lower part of said panel against said vehicle side, said means comprising hooks formed to extend around behind said vehicle side, at least one of said hooks being movable relative to said panel to permit removal of said cover.

7. The combination of a fender having a wheel access opening in its side and a fender shield for covering said wheel access opening, means near the center of the top of said opening for supporting said fender shield on the outside of said fender while permitting swinging thereof in a plane parallel to the side of the fender, means near one lower corner of said fender shield for engaging the edge of the fender and preventing swinging of said fender shield in one direction in a plane parallel to the side of the fender, and cam means near the other corner of said fender shield for engaging the edge of the fender and holding down and urging said fender shield to swing in the direction prevented by the second of said means, the fender engaging edge of said shield being developed so that it gradually diverges from said fender beginning at said supporting means and reaching a maximum at substantially the bottom of said shield, said means near the lower corners of said fender being arranged to hold said shield tightly against said fender.

8. In a fender and fender shield assembly, a fender member having a wheel access opening, a resilient fender shield member for covering said opening, one of said members having a stud thereon, said stud having an enlarged head, and the other of said members having a cooperating keyhole slot therein, said stud being disposed in said keyhole slot and being located substantially at the top of said opening, the fender-engaging edge of said shield being developed so that it gradually diverges from said fender beginning at said stud and keyhole slot support and reaching a maximum at a point in proximity to the lower corners of said shield, and means for holding said lower corners against said fender whereby said shield is held in a strained position on said fender.

9. In combination, a fender having a wheel access opening, a resilient fender shield for covering said opening, said fender and fender shield being provided with means at the top of said opening for supporting said fender shield at a single point on said fender, the fender engaging edge of said shield being developed so that it gradually diverges from said fender beginning at said point of support and reaching a maximum at a point in proximity to the lower corners of said shield, and means for holding said lower corners against said fender, whereby said shield is held in a strained position on said fender.

10. As an article of manufacture, a shield for disposition over the wheel access opening of a vehicle body part, said shield being shaped and arranged to overlap the opening of said body part a substantial portion at least at one end thereof, said shield having means in proximity to its top for engaging said body part and supporting said shield thereon, and said shield having additional latching means for engaging said body part in close proximity to the opening thereof at a point spaced inwardly a substantial distance from the vehicle body part contact edge of said shield, said latching means being arranged to place and maintain said shield under stress when said shield is mounted on said body part.

HERBERT S. JANDUS.
ARTHUR P. FERGUESON.